United States Patent  (10) Patent No.: US 10,920,646 B2
Sato et al.  (45) Date of Patent: Feb. 16, 2021

(54) EXHAUST GAS PURIFICATION SYSTEM

(71) Applicant: MITSUBISHI JIDOSHA KOGYO KABUSHIKI KAISHA, Tokyo (JP)

(72) Inventors: Ryosuke Sato, Tokyo (JP); Kinichi Iwachido, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/468,209

(22) PCT Filed: Sep. 14, 2017

(86) PCT No.: PCT/JP2017/033307
§ 371 (c)(1),
(2) Date: Jun. 10, 2019

(87) PCT Pub. No.: WO2018/116550
PCT Pub. Date: Jun. 28, 2018

(65) Prior Publication Data
US 2020/0018216 A1   Jan. 16, 2020

(30) Foreign Application Priority Data

Dec. 20, 2016 (JP) .............................. JP2016-246768

(51) Int. Cl.
*F01N 11/00* (2006.01)
*F01N 13/00* (2010.01)
*B01D 53/94* (2006.01)

(52) U.S. Cl.
CPC ............ *F01N 11/00* (2013.01); *F01N 13/009* (2014.06); *B01D 53/94* (2013.01);
(Continued)

(58) Field of Classification Search
CPC .......................... B01D 2255/902–9027; B01D 2255/903–9037; B01D 2255/911;
(Continued)

(56) References Cited

U.S. PATENT DOCUMENTS 6,296,813 B1 * 10/2001 Ishii ...................... F01N 3/0814
422/171
8,524,185 B2 * 9/2013 Caudle .................. B01J 37/0246
423/237
(Continued)

FOREIGN PATENT DOCUMENTS

CN      105555403 A    5/2016
DE   102014110811 A1   2/2015
(Continued)

OTHER PUBLICATIONS

Japanese Office Action for Japanese Application No. 2016-246768, dated Nov. 19, 2019, with an English translation.

(Continued)

*Primary Examiner* — Mark A Laurenzi
*Assistant Examiner* — Mickey H France
(74) *Attorney, Agent, or Firm* — Birch, Stewart, Kolasch & Birch, LLP.

(57) ABSTRACT

An exhaust gas purification system for an engine includes an exhaust passage extending from the combustion chambers of the engine, and an exhaust purifying unit disposed in the exhaust passage and configured to purify exhaust gas in the exhaust passage. The exhaust purifying unit includes a carrier disposed in the exhaust passage, a first purifier having at least a function of oxidizing components in the exhaust gas. The first purifier covers, as an underlayer, an outer surface of the carrier, and a second purifier having a function of purifying the exhaust gas by reducing, using occluded ammonia, the components in the exhaust gas that have been (Continued)

oxidized in the first purifier. The second purifier includes a superposed portion covering, as an upper layer, an outer surface of the first purifier.

15 Claims, 4 Drawing Sheets

(52) U.S. Cl.
CPC .. *B01D 2255/904* (2013.01); *B01D 2255/911* (2013.01); *F01N 2560/026* (2013.01); *F01N 2560/14* (2013.01)

(58) Field of Classification Search
CPC ......... B01D 53/92–9477; F01N 13/009; F01N 3/2803; F01N 3/28; F01N 2900/1616; F01N 3/101; F01N 3/103; F01N 3/105; F01N 3/106; F01N 3/108; F01N 2510/068; F01N 2510/0682; F01N 2510/0684; F01N 2570/14; F01N 2570/145; F01N 2570/18
USPC ................. 60/282, 295, 297, 299, 301, 302; 502/527.12, 527.13
See application file for complete search history.

(56) References Cited

U.S. PATENT DOCUMENTS

| | | | |
|---|---|---|---|
| 8,530,372 B2* | 9/2013 | Luo | B01J 23/66 502/303 |
| 8,568,678 B2* | 10/2013 | Soeger | B01J 37/0246 423/239.2 |
| 9,017,626 B2* | 4/2015 | Tang | B01J 21/066 423/213.2 |
| 9,702,286 B2* | 7/2017 | Nagoshi | F01N 3/103 |
| 9,764,310 B2* | 9/2017 | Markatou | B01D 53/944 |
| 9,789,441 B2* | 10/2017 | Larsson | B01J 29/7615 |
| 9,993,772 B2* | 6/2018 | Gilbert | F01N 3/106 |
| 10,010,873 B2* | 7/2018 | Aoki | F01N 3/10 |
| 10,213,741 B2* | 2/2019 | Sato | B01J 37/0244 |
| 2001/0006934 A1* | 7/2001 | Kachi | B01J 37/0244 502/325 |
| 2004/0001781 A1* | 1/2004 | Kumar | B01D 53/945 422/180 |
| 2008/0053071 A1 | 3/2008 | Adams et al. | |
| 2008/0081762 A1* | 4/2008 | Kitamura | B01D 53/945 502/326 |
| 2009/0203515 A1* | 8/2009 | Murabayashi | B01D 53/885 502/4 |
| 2010/0183490 A1* | 7/2010 | Hoke | B01D 53/9477 423/213.5 |
| 2010/0257843 A1* | 10/2010 | Hoke | B01J 37/0246 60/274 |
| 2011/0271664 A1* | 11/2011 | Boorse | B01D 53/9468 60/301 |
| 2011/0286900 A1 | 11/2011 | Caudle et al. | |
| 2013/0156668 A1* | 6/2013 | Spurk | F01N 3/2066 423/213.2 |
| 2013/0189172 A1* | 7/2013 | Spurk | B01D 53/9422 423/213.2 |
| 2013/0310248 A1* | 11/2013 | Aoki | B01J 37/0248 502/303 |
| 2014/0212350 A1* | 7/2014 | Andersen | B01J 23/6527 423/237 |
| 2015/0037233 A1 | 2/2015 | Fedeyko et al. | |
| 2015/0165423 A1* | 6/2015 | Sung | B01J 37/0244 423/213.5 |
| 2015/0217284 A1* | 8/2015 | Wille | B01J 23/44 423/212 |
| 2015/0217285 A1* | 8/2015 | Wille | B01J 23/462 502/304 |
| 2015/0217286 A1* | 8/2015 | Wille | B01J 35/1009 502/304 |
| 2015/0273452 A1* | 10/2015 | Chiffey | B01D 53/9463 423/213.5 |
| 2015/0352492 A1* | 12/2015 | Andersen | B01D 53/9436 423/237 |
| 2015/0360178 A1* | 12/2015 | Kalwei | B01D 53/9477 423/212 |
| 2016/0008759 A1* | 1/2016 | Sonntag | B01D 53/9472 423/239.1 |
| 2016/0038878 A1* | 2/2016 | Sonntag | B01D 53/9431 423/213.5 |
| 2016/0045868 A1* | 2/2016 | Sonntag | B01J 21/06 423/213.2 |
| 2016/0236179 A1* | 8/2016 | Chiffey | B01J 23/44 |
| 2016/0367973 A1* | 12/2016 | Larsson | B01D 53/9436 |
| 2016/0367975 A1* | 12/2016 | Lu | B01J 35/0006 |
| 2017/0087541 A1* | 3/2017 | Andersen | B01D 53/8634 |
| 2017/0095805 A1* | 4/2017 | Chiffey | B01D 53/9422 |
| 2017/0096923 A1* | 4/2017 | Chiffey | F01N 3/0821 |
| 2017/0106337 A1* | 4/2017 | Chiffey | F01N 3/103 |
| 2017/0189854 A1 | 7/2017 | Andersen et al. | |
| 2017/0348674 A1* | 12/2017 | Suzuki | B01D 53/945 |
| 2018/0043305 A1* | 2/2018 | Voss | B01D 53/9477 |
| 2018/0065083 A1* | 3/2018 | Bidal | B01J 23/688 |
| 2018/0065086 A1* | 3/2018 | Bidal | B01J 29/743 |
| 2018/0078926 A1* | 3/2018 | Chen | B01D 53/944 |
| 2018/0111086 A1* | 4/2018 | Chen | F01N 3/2066 |
| 2018/0156090 A1* | 6/2018 | Xue | F01N 3/101 |
| 2018/0229224 A1* | 8/2018 | Zheng | B01J 29/072 |
| 2018/0236401 A1* | 8/2018 | Chinzei | B01J 23/63 |
| 2018/0280877 A1* | 10/2018 | Chen | B01J 21/063 |
| 2018/0280879 A1* | 10/2018 | Howells | F01N 3/2066 |
| 2018/0283250 A1* | 10/2018 | Chen | B01J 23/42 |
| 2018/0304244 A1* | 10/2018 | Bidal | B01J 20/28045 |
| 2018/0353902 A1* | 12/2018 | Chiffey | B01D 53/62 |
| 2019/0001268 A1* | 1/2019 | Chen | B01D 53/9418 |
| 2019/0168199 A1* | 6/2019 | Yang | B01D 53/9468 |
| 2019/0170042 A1* | 6/2019 | Xue | B01J 37/08 |
| 2019/0193024 A1* | 6/2019 | Hayama | B01D 53/944 |
| 2019/0201844 A1* | 7/2019 | Hayama | B01J 37/0215 |
| 2019/0201845 A1* | 7/2019 | Hayama | B01J 23/6562 |
| 2019/0217278 A1* | 7/2019 | Chiffey | B01J 21/12 |
| 2019/0283011 A1* | 9/2019 | Chen | B01J 21/12 |
| 2019/0299161 A1* | 10/2019 | Collier | B01D 53/9468 |
| 2019/0353068 A1* | 11/2019 | Moser | F01N 3/0842 |
| 2019/0358615 A1* | 11/2019 | Sung | B01J 29/7415 |
| 2020/0018216 A1* | 1/2020 | Sato | F01N 13/009 |
| 2020/0047119 A1* | 2/2020 | Miyasaka | F01N 3/08 |
| 2020/0055035 A1* | 2/2020 | Zheng | F01N 3/101 |
| 2020/0070133 A1* | 3/2020 | Bidal | B01J 29/46 |
| 2020/0108373 A1* | 4/2020 | Xue | G01N 21/3563 |

FOREIGN PATENT DOCUMENTS

| | | |
|---|---|---|
| JP | 2002-263450 A | 9/2002 |
| JP | 2008-62230 A | 3/2008 |
| JP | 2012-62818 A | 3/2012 |
| JP | 2016-532548 A | 10/2016 |

OTHER PUBLICATIONS

English translation of the International Preliminary Report on Patentability and Written Opinion, dated Jun. 25, 2019, for International Application No. PCT/JP2017/033307.
Extended European Search Report, dated Sep. 3, 2019, for European Application No. 17882563.4.
International Search Report, dated Oct. 10, 2017, for International Application No. PCT/JP2017/033307.
Chinese Office Action for Chinese Application No. 201780078380.2 dated Nov. 20, 2020 with English translation.

* cited by examiner

EXHAUST GAS PURIFICATION SYSTEM

TECHNICAL FIELD

This invention relates to an exhaust gas purification system for purifying exhaust gas from an engine.

BACKGROUND ART

In gasoline engines, three-way catalysts are used in many conventional exhaust gas purification systems disposed at an intermediate portion of the exhaust passage.

A three-way catalyst is capable of removing, from exhaust gas, hydrocarbons (HC), carbon monoxide (CO), and nitrogen oxides (NOx) using a material containing precious metals such as platinum, palladium and rhodium, by oxidizing hydrocarbons to water and carbon dioxide, oxidizing carbon monoxide to carbon dioxide, and reducing nitrogen oxides to nitrogen.

Exhaust gas purification systems are known that include a plurality of catalytic devices disposed in the exhaust passage in juxtaposition with each other. For example, the exhaust gas purification system disclosed in the below-identified Patent Document 1 includes an upstream catalyst (proximity catalyst) located close to the engine body and configured to be activated at an early stage, and a downstream catalyst (underfloor catalyst) located downstream of the upstream catalyst.

A three-way catalyst could produce ammonia ($NH_3$) when nitrogen oxides are reduced to nitrogen if the nitrogen is excessively reduced. Such excessive reduction of nitrogen tends to occur in a high load region of the engine such as during acceleration of the engine.

If ammonia is produced in an upstream catalyst of an exhaust gas purification system including the upstream catalyst and a downstream catalyst, the downstream catalyst could oxidize the ammonia, thereby producing nitrogen oxides again.

Thus, for example, the below-identified Patent Document 2 proposes to provide, downstream of an after-treatment device for reducing nitrogen oxides, such as a three-way catalyst, a selective catalytic reduction device for adsorbing ammonia produced in the after-treatment device, and purifying nitrogen oxides with the adsorbed ammonia.

PRIOR ART DOCUMENTS

Patent Documents

Patent Document 1: JP 2002-263450A
Patent Document 2: JP 2008-62230A

SUMMARY OF THE INVENTION

Object of the Invention

According to the technical solution proposed by Patent Document 2, ammonia produced from nitrogen oxides is adsorbed in the selective catalytic reduction device on the downstream side so that ammonia is less likely to be released into the atmosphere. However, according to the operating conditions, the amount of ammonia produced could exceed the ability of the selective catalytic reduction device to treat ammonia. The larger the amount of ammonia produced, the larger the amount of emissions of nitrogen oxides produced from ammonia. Thus, an exhaust gas purification system capable of treating nitrogen oxides and ammonia more reliably is desired.

An object of the present invention is to provide an exhaust gas purification system capable of purifying nitrogen oxides and ammonia more reliably.

Means for Achieving the Object

In order to achieve this object, the present invention provides an exhaust gas purification system for an engine having a combustion chamber, the exhaust gas purification system comprising: an exhaust passage extending from the combustion chamber of the engine; and an exhaust purifying unit disposed in the exhaust passage and configured to purify exhaust gas in the exhaust passage, the exhaust purifying unit including: a carrier disposed in the exhaust passage; a first purifier having at least a function of oxidizing components in the exhaust gas, the first purifier covering, as an underlayer, an outer surface of the carrier; and a second purifier having a function of purifying the exhaust gas by reducing, using occluded ammonia, the components in the exhaust gas that have been oxidized in the first purifier, the second purifier including a superposed portion covering, as an upper layer, an outer surface of the first purifier.

The second purifier may further include an unsuperposed portion located downstream of the first purifier and covering the outer surface of the carrier.

The superposed portion may include an upstream high temperature purifying part having a first activation temperature at which the upstream high-temperature purifying part is activated, and the unsuperposed portion may include a downstream low temperature purifying part having a second activation temperature at which the downstream low temperature purifying part is activated, the second activation temperature being lower than the first activation temperature.

The unsuperposed portion may further include a downstream high temperature purifying part disposed under the downstream low temperature purifying part, the downstream high temperature purifying part having a third activation temperature at which the downstream high temperature purifying part is activated, the third activation temperature being higher than the second activation temperature.

The first activation temperature may be equal to the third activation temperature.

The first purifier may comprise a three-way catalyst layer, while the second purifier may comprise a selective catalytic reduction catalyst layer.

The above-mentioned exhaust purifying unit may comprise a downstream exhaust purifying unit, and the exhaust gas purification system may further comprise an upstream exhaust purifying unit disposed upstream of and in juxtaposition with the downstream exhaust purifying unit along the exhaust gas flow direction in the exhaust passage. In this case, the upstream exhaust purifying unit includes the above-mentioned first purifier, and is free of the above-mentioned second purifier.

The exhaust gas purification system may further comprise: an ammonia detector disposed upstream of the second purifier, the ammonia detector being configured to obtain first information regarding the amount of ammonia flowing into the second purifier; a nitrogen oxide detector disposed downstream of the second purifier, the nitrogen oxide detector being configured to obtain second information regarding the amount of emissions of nitrogen oxides; and an engine control unit configured to control the amount of fuel injected into the combustion chamber and an amount of intake air supplied into the combustion chamber, based on the first information and the second information.

Advantages of the Invention

According to the present invention, the first purifier for at least oxidizing the components in the exhaust gas covers, as an underlayer, the outer surface of the carrier, while the second purifier includes a superposed portion covering, as an upper layer, the outer surface of the first purifier, so that the second purifier, as the upper layer, is capable of purifying nitrogen oxides produced in the first purifier, as the underlayer, due to oxidation of ammonia. The exhaust gas purification system is thus capable of effectively purifying nitrogen oxides and ammonia.

EMBODIMENT

Figure 1:
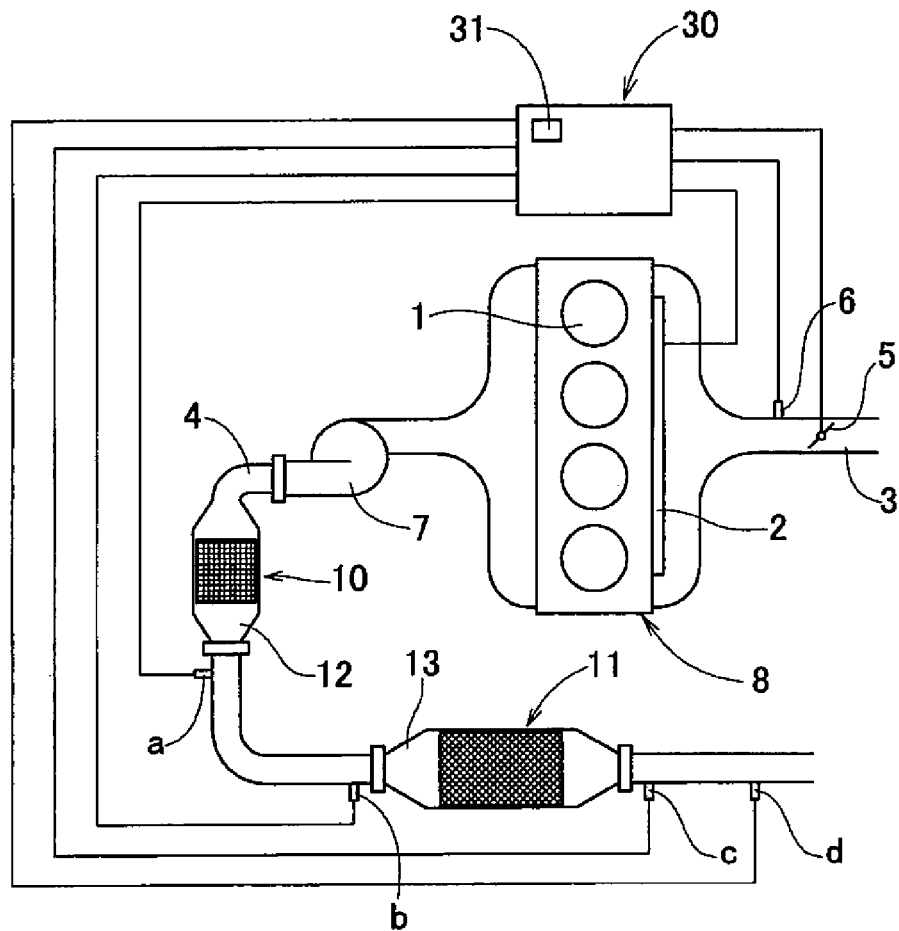
FIG. 1 schematically shows an exhaust gas purification system for an engine embodying the present invention.
Figure 2:
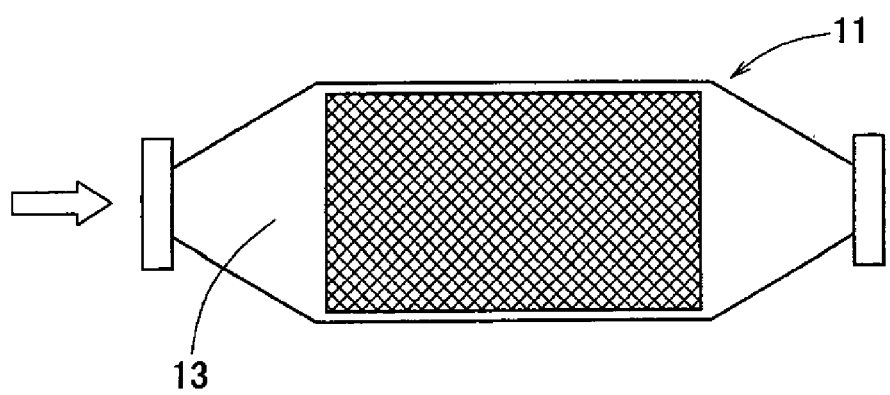
FIG. 2 is a plan view of a downstream exhaust purifying unit.

Now the embodiment of the present invention is described with reference to the drawings. FIG. 1 schematically shows the structure of the exhaust gas purification system for an engine according to this embodiment.

As shown in FIG. 1, an intake passage 3 and an exhaust passage 4 are connected to combustion chambers 1 of an engine 8 so that air is supplied into the combustion chambers 1 through the intake passage 3. The engine 8 includes a fuel injector 2 that injects fuel into the combustion chambers 1. Exhaust gas from the combustion chambers 1 flows through the exhaust passage 4 extending from the combustion chambers 1, passes through an upstream exhaust purifying unit 10 and a downstream exhaust purifying unit 11 that are configured to remove noxious substances from the exhaust gas, and is released into the atmosphere.

In the intake passage 3, there are, from upstream to downstream, an air cleaner, a throttle valve 5 that controls the flow rate of intake air by changing the sectional area of the flow passage, and an air flow sensor 6 for detecting the amount of intake air.

In the exhaust passage 4, there are, from upstream to downstream, a turbine 7 of a mechanical supercharger, the upstream and downstream exhaust purifying units 10 and 11, and a muffler (silencer).

The upstream exhaust purifying unit 10 is a proximity catalyst that is located close to the combustion chambers 1 of the engine 8 and is relatively more frequently exposed to high temperature exhaust gases. The downstream exhaust purifying unit 11 is an underfloor catalyst located apart from the combustion chambers 1 of the engine 8, and is relatively less frequently exposed to high temperature exhaust gases.

The upstream exhaust purifying unit 10 comprises an upstream catalyst case 12, a carrier 20 disposed inside the upstream catalyst case 12, and a first purifier A covering the outer surface of the carrier 20.

The carrier 20 has a honeycomb structure comprising an aggregate of a large number of cells through which exhaust gas can pass. The carrier 20 is made of a crystalline ceramic material that is low in thermal expansion coefficient and high in heat shock resistance (such as cordierite).

Figure 3A:
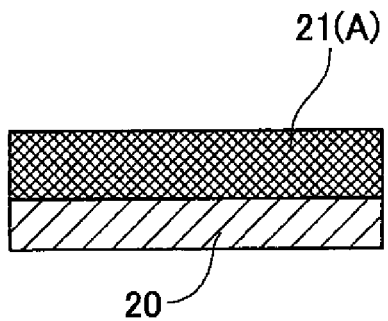
FIG. 3A is a partial enlarged sectional view of an upstream exhaust purification unit.

As shown in FIG. 3A, the first purifier A of the upstream exhaust purifying unit 10 comprises a nitrogen oxide reduction element 21 having the function of reducing nitrogen oxides in the exhaust gas. In the embodiment, the nitrogen oxide reduction element 21 is a three-way catalyst layer.

In the three-way catalyst layer, noxious substances contained in the exhaust gas, i.e., hydrocarbons, carbon monoxide, and nitrogen oxides are removed from the exhaust gas using a material containing precious metals such as platinum, palladium and rhodium. In particular, hydrocarbons are oxidized to water and carbon dioxide; carbon monoxide is oxidized to carbon dioxide; and nitrogen oxides are reduced to nitrogen.

The downstream exhaust purifying unit 11 comprises a downstream catalyst case 13, a carrier 20 disposed inside the downstream catalyst case 13, and first and second purifiers A and B. The carrier 20 of the downstream exhaust purifying unit 11 is the same in structure, material, and shape as the carrier 20 of the upstream exhaust purifying unit 10.

The first purifier A of the downstream exhaust purifying unit 11 has at least the function of oxidizing components in the exhaust gas. The second purifier B has the function of reducing and purifying the gas oxidized in the first purifier A, using occluded ammonia.

As with the first purifier A of the upstream exhaust purifying unit 10, the first purifier A of the downstream exhaust purifying unit 11 comprises a nitrogen oxide reduction element 21 having the function of reducing nitrogen oxides in the exhaust gas. In the embodiment, the nitrogen oxide reduction element 21 is a three-way catalyst layer, and the first purifier A of the downstream exhaust purifying unit 11 has at least the function of oxidizing ammonia flowing in from upstream. Thus, the three-way catalyst layer has both the functions of oxidation and reduction.

In the first purifier A of the upstream exhaust purifying unit 10 and the first purifier A of the downstream exhaust purifying unit 11, especially during acceleration, ammonia is produced due to excessive reduction of nitrogen oxides. The second purifier B of the downstream exhaust purifying unit 11 has the function of detoxifying nitrogen oxides produced by re-oxidation of the ammonia produced in the first purifiers A, before the exhaust gas is released into the atmosphere. In the embodiment, the second purifier B comprises a selective catalytic reduction catalyst layer.

The selective catalytic reduction catalyst layer has the function of detoxifying nitrogen oxides produced by oxidation of ammonia after passing through the first purifiers A (hereinafter referred to as "ammonia-derived nitrogen oxides"), as well as nitrogen oxides produced due to combustion in the engine, by reducing such nitrogen oxides to nitrogen.

That is, the second purifier B has, on the one hand, the function of occluding ammonia that flows into the second purifier B from upstream. On the other hand, if ammonia is converted to nitrogen oxides in the first purifiers A due to excessive oxidation of the ammonia, the second purifier B reduces such nitrogen oxides to nitrogen by reacting the nitrogen oxides with the occluded ammonia, thereby purifying the exhaust gas.

Figure 3B:
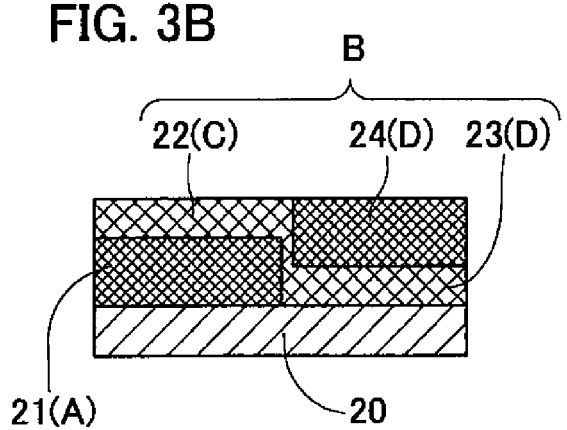
FIG. 3B is a partial enlarged sectional view of the downstream exhaust purifying unit.
Figure 4A:
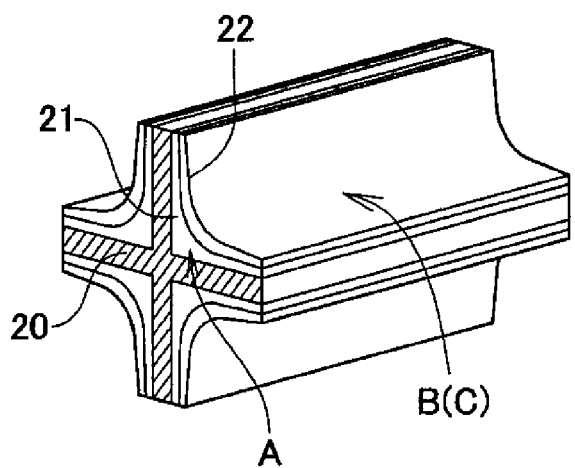
FIG. 4A is a perspective view of an upstream portion of the downstream exhaust purifying unit.
Figure 4B:
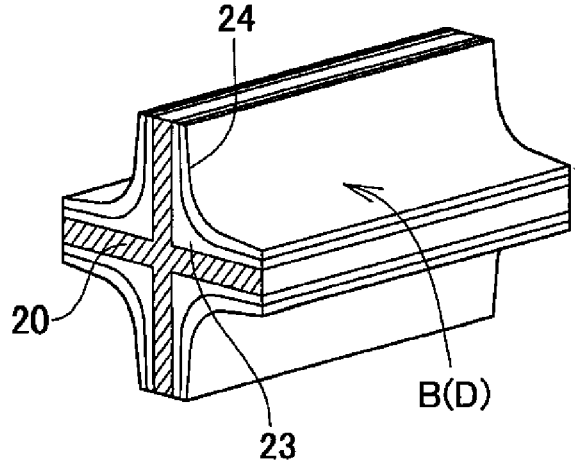
FIG. 4B is a perspective view of a downstream portion of the downstream exhaust purifying unit.

As shown in FIG. 3B, the first purifier A of the downstream exhaust purifying unit 11 is located at the upstream side of the downstream exhaust purifying unit 11 and covers the outer surface of the carrier 20, as an underlayer. The first purifier A extends the upstream half area of the entire length of the downstream exhaust purifying unit 11.

The second purifier B of the downstream exhaust purifying unit 11 includes a superposed portion C covering the outer surface of the first purifier A as an upper layer, and a portion D located downstream of (and thus not superposed on) the first purifier A and covering the outer surface of the carrier 20 (the portion D is hereinafter referred to as the "unsuperposed portion D"). Thus, the superposed portion C extends the upstream half area of the entire length of the downstream exhaust purifying unit 11, whereas the unsuperposed portion D extending its downstream half area.

The superposed portion C of the second purifier B includes an upstream high temperature purifying part 22 which is activated at a predetermined first activation temperature. In the example of FIG. 3B, the superposed portion C consists only of the upstream high temperature purifying part 22, but the superposed portion C may include an element or elements other than the upstream high temperature purifying part 22.

The unsuperposed portion D of the second purifier B includes a downstream low temperature purifying part 24 which is activated at a second activation temperature lower than the first activation temperature. The unsuperposed portion D further includes a downstream high temperature purifying part 23 which is activated at a third activation temperature higher than the second activation temperature. In the example shown, the downstream high temperature purifying part 23 is located closer to the surface of the carrier 20 and forms an underlayer, whereas the downstream low temperature purifying part 24 covers the downstream high temperature purifying part 23 and forms an upper layer. In FIG. 3B, the unsuperposed portion D consists only of the downstream high temperature purifying part 23 and the downstream low temperature purifying part 24, but the unsuperposed portion D may include another element.

As described above, both the upstream exhaust purifying unit 10 and the downstream exhaust purifying unit 11 include the first purifiers A, while only the downstream exhaust purifying unit 11 includes the second purifier B. The first purifier A of the downstream exhaust purifying unit 11 is located at the upstream side thereof.

Although the upstream high temperature purifying part 22 having the first activation temperature, and the downstream high temperature purifying part 23 having the third activation temperature may be made from different materials from each other, in the embodiment, the upstream high temperature purifying part 22 and the downstream high temperature purifying part 23 are made from the same material, and thus have the same activation temperature. If the upstream high temperature purifying part 22 and the downstream high temperature purifying part 23 are made from different materials, the respective materials are preferably selected such that the first activation temperature is higher than the third activation temperature.

In the embodiment, the upstream high temperature purifying part 22 and the downstream high temperature purifying part 23 of the second purifier B are Fe-zeolite catalysts, which are high temperature purifying type catalysts having a relatively high activation temperature, while the downstream low temperature purifying part 24 is a Cu-zeolite catalyst, which is a low temperature purifying catalyst having a relatively low activation temperature.

Figure 5:
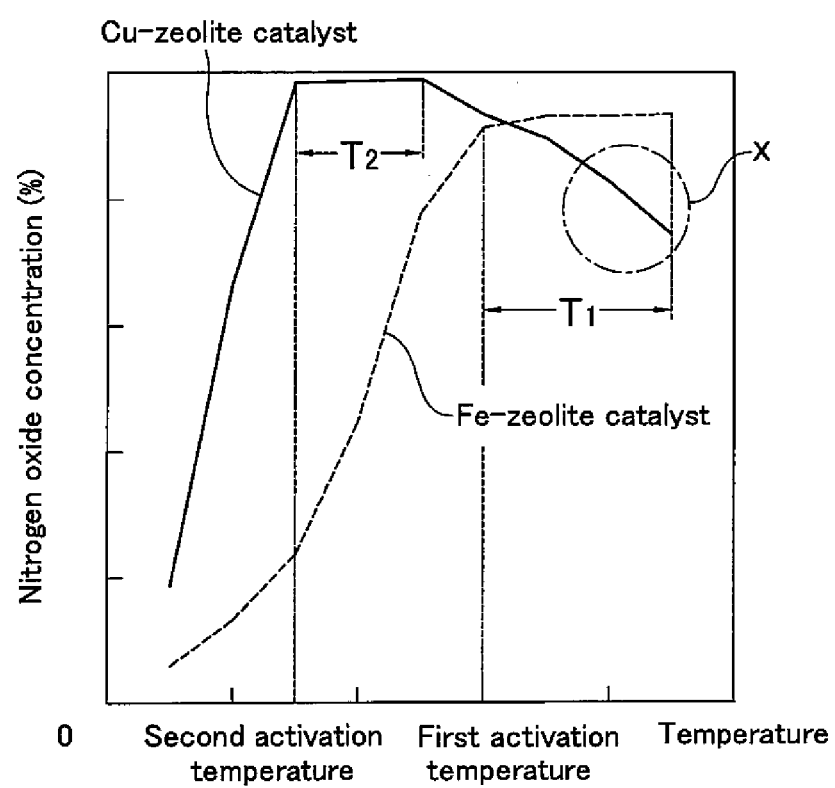
FIG. 5 is a graph showing the temperature characteristics of catalysts.

Generally speaking, zeolite catalysts perform best within specific temperature ranges. As shown in the graph of FIG. 5, the first activation temperature (=third activation temperature), namely the activation temperature of an Fe-zeolite catalyst, which corresponds to the upstream high temperature purifying part 22, is higher than the second activation temperature, namely the activation temperature of a Cu-zeolite catalyst, which corresponds to the downstream low temperature purifying part 24. Here, the "activation temperature" refers to the (minimum) temperature at which each catalyst is capable of performing the required purifying function. That is, within a predetermined temperature range T1, T2 above the activation temperature, each catalyst is capable of performing the required purifying function.

Since a Cu-zeolite catalyst, namely a low temperature purifying catalyst, is disposed on the downstream side of the second purifier B, while an Fe-zeolite catalyst, namely a high temperature purifying catalyst, is disposed on the upstream side of the second purifier B, the respective catalysts are capable of effectively performing the purifying functions in the exhaust passage 4, in which the exhaust temperature gradually decreases from upstream to downstream, thus reducing the amount of emissions of nitrogen oxides.

Each of the catalyst layers of the first purifiers A and the second purifier B can be formed on the surface of the corresponding carrier 20 by preparing slurry containing precious metals as major components, immersing the carrier 20 in the slurry, and drying and baking the slurry. By repeating this process, a plurality of catalyst layers can be superposed on the carrier.

As shown in FIG. 1, an ammonia detector b is attached to the exhaust passage 4 at its portion upstream of (and close to the inlet of) the downstream exhaust purifying unit 11, namely upstream of the second purifier B, to obtain information regarding the amount of ammonia flowing into the downstream exhaust purifying unit 11. A nitrogen oxide detector c is attached to the exhaust passage 4 at its portion downstream of (and close to the outlet of) the downstream exhaust purifying unit 11, namely downstream of the second purifier B, to obtain information regarding the amount of nitrogen oxide emissions. An $O_2$ sensor d is also attached to the exhaust passage 4 at its portion downstream of the downstream exhaust purifying unit 11.

An exhaust gas temperature detector a is attached to the exhaust passage 4 at its portion downstream of (and close to the outlet of) the upstream exhaust purifying unit 10 to detect the exhaust gas temperature. The exhaust gas temperature detector a may be provided, instead of at this location, (or at least one additional exhaust gas temperature detector a may be provided) upstream of (and close to the inlet of) the upstream exhaust purifying unit 10, upstream of (and close to the inlet of) the downstream exhaust purifying unit 11, or downstream of (and close to the outlet of) the downstream exhaust purifying unit 11.

The vehicle on which the above-described engine 8 is mounted includes an electronic control unit 30 which control the intake and exhaust valves, the fuel injector, and all the other elements used to control the engine 8, and all the other electronically controlled elements of the vehicle. Information from the various sensors is transmitted to the electronic control unit 30 through cables.

In particular, the electronic control unit 30 includes an engine control subunit 31 configured to control the amount of fuel injected into the combustion chambers 1 and the amount of air supply into the combustion chambers 1, based on the information regarding the amount of ammonia flowing into the downstream exhaust purifying unit 11, as detected by the ammonia detector b, and the information regarding the amount of nitrogen oxide emissions, as detected by the nitrogen oxide detector c.

Figure 6:
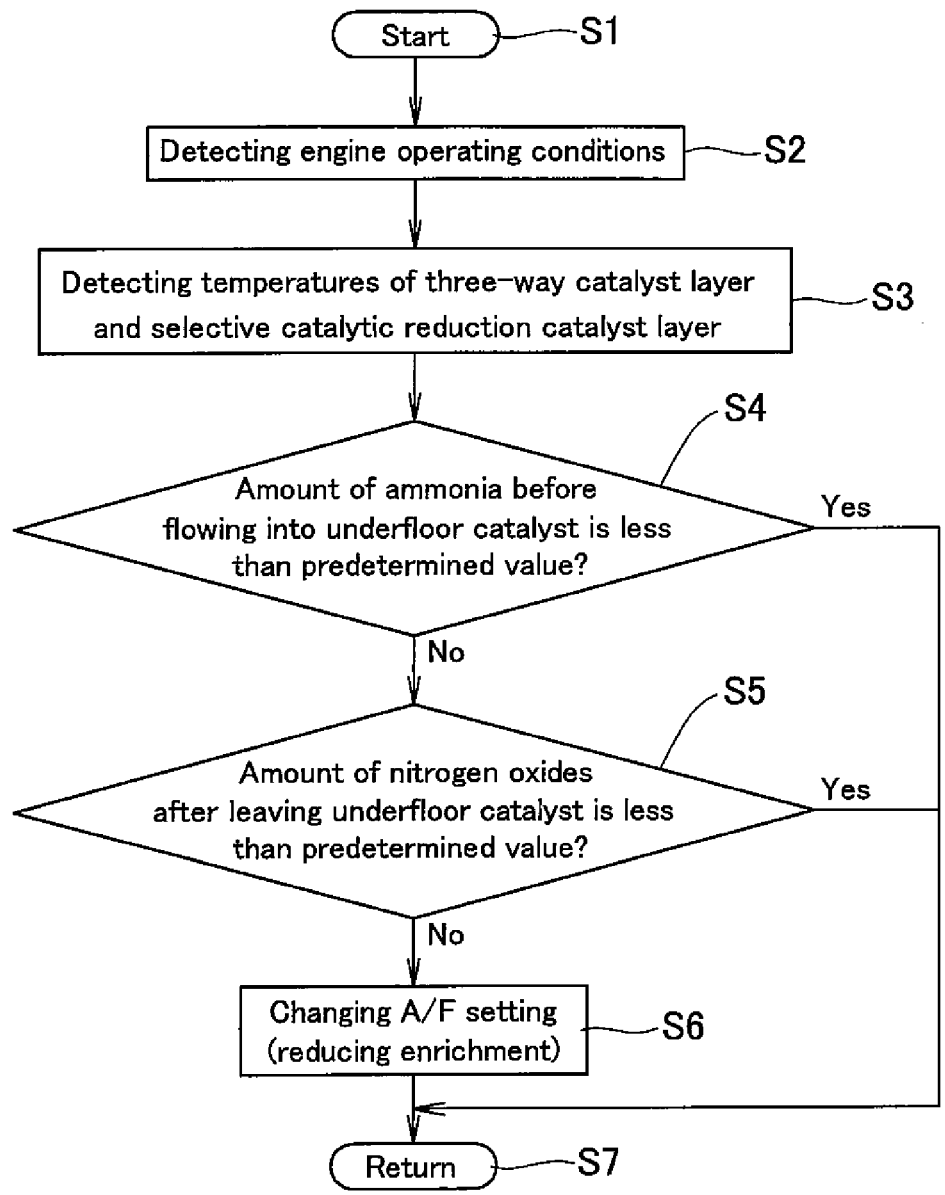
FIG. 6 is a flowchart showing a method of controlling the exhaust gas purification system for an engine according to the present invention.

The engine control subunit 31 performs, especially during acceleration, control as shown by the flowchart of FIG. 6 to control the amount of ammonia produced in the upstream exhaust purifying unit 10, thereby reducing the amount of nitrogen oxide emissions.

In particular, the electronic control unit 30 (engine control subunit 31) starts the control of FIG. 6 in Step S1; detects, in Step S2, the current operating conditions of the vehicle; and in the following Step S3, detects the temperature of the three-way catalyst layer of the upstream exhaust purifying unit 10 and the temperatures of the three-way catalyst layer and the selective catalytic reduction catalyst layer of the downstream exhaust purifying unit 11. If exhaust gas temperature detectors a are provided for the respective ones of the three-way catalyst layers and the selective catalytic reduction catalyst layer, their temperatures are directly detected by the respective temperature detectors. If, for example, only one exhaust gas temperature detector a is used, the temperatures of some or all of the catalyst layers can be estimated from the temperature detected by the only one exhaust gas temperature detector a based on e.g., experimental data.

In Step S4, the electronic control unit 30 detects the amount of ammonia flowing into the second purifier B of the downstream exhaust purifying unit 11. This figure can be estimated from the information obtained by the ammonia detector b, or alternatively, from the information regarding an operating condition of the vehicle, such as the exhaust gas temperature in the downstream exhaust purifying unit 11 or the air/fuel ratio.

The ammonia detector b detects ammonia produced mainly in the upstream exhaust purifying unit 10, and thus, the amount of ammonia produced in the first purifier A of the downstream exhaust purifying unit 11 is not included in the amount of ammonia detected by the ammonia detector b. Thus, the total amount of ammonia supplied to the second purifier B, including the amount of ammonia produced in the first purifier A of the downstream exhaust purifying unit 11, may be estimated based on e.g., experimental data. The electronic control unit 30 may be configured to perform this estimation based on the information from the ammonia detector b.

If the amount of ammonia detected in Step S4 is less than a predetermined value, the electronic control unit 30 proceeds to Step S7, and repeats the above-described cycle. If the amount of ammonia detected in Step S4 is equal to or larger than the predetermined value, the electronic control unit 30 moves to Step S5.

In Step S5, the electronic control unit 30 measures the amount of nitrogen oxides in the exhaust passage 4 at its portion downstream of the downstream exhaust purifying unit 11, and if the thus measured amount of nitrogen oxides is less than a predetermined value, the electronic control unit 30 proceeds to Step S7 and repeats the above-described cycle. If the amount of nitrogen oxides measured in Step S5 is equal to or larger than the predetermined value, the electronic control unit 30 proceeds to Step S6.

In Step S6, the electronic control unit 30 performs control to reduce the amount of nitrogen oxide emissions to less than the predetermined value. It is considered that especially during acceleration, ammonia-derived nitrogen oxides increase in the first purifiers A due to the conversion of nitrogen oxides to ammonia such that the amount of nitrogen oxides in the second purifier B exceeds the purifying ability of the second purifier B to remove nitrogen oxides.

Therefore, in Step 6, the electronic control unit 30 reduces nitrogen oxides and ammonia-derived nitrogen oxides by controlling the air/fuel ratio to reduce the degree of enrichment of the air/fuel ratio of the intake air. Reduction in the degree of enrichment of the air/fuel ratio can be achieved by adjusting the central position of feedback control based on information from e.g., the $O_2$ sensor d, and an air/fuel ratio sensor. This control is repeated, that is, the steps S1 through S7 are repeatedly carried out, until the amount of nitrogen oxides falls below the predetermined value.

In the embodiment, the first purifier A of the downstream exhaust purifying unit 11 extends the upstream half area of the entire length of the downstream exhaust purifying unit 11; the superposed portion C of the second purifier B extends the upstream half area of the entire length of the downstream exhaust purifying unit 11; and the unsuperposed portion D of the second purifier B extends the downstream half area of the entire length of the downstream exhaust purifying unit 11. However, the ratios of the lengths of these portions to the entire length of the downstream exhaust purifying unit 11 are not limited to the above values. For example, the above portions may be arranged such that the first purifier A of the downstream exhaust purifying unit 11 extends the upstream two-third area of the entire length of the downstream exhaust purifying unit 11; the superposed portion C of the second purifier B extends the upstream two-third area of the entire length of the downstream exhaust purifying unit 11; and the unsuperposed portion D of the second purifier B extends the downstream one-third area of the entire length of the downstream exhaust purifying unit 11. In order to ensure the three-way catalytic action of underfloor catalyst and to reduce the amount of nitrogen oxides, the length of the first purifier A of the downstream exhaust purifying unit 11 is preferably not less than half and not more than two-thirds of the entire length of the downstream exhaust purifying unit 11.

In the embodiment, the unsuperposed portion D of the second purifier B comprises the downstream high temperature purifying part 23 as the underlayer, and the downstream low temperature purifying part 24 as the upper layer. However, the unsuperposed portion D of the second purifier B may consist only of the downstream high temperature purifying part 23, or may consist only of the downstream low temperature purifying part 24.

In the embodiment, the second purifier B comprises the superposed portion C covering the outer surface of the first purifier A as the upper layer, and the unsuperposed portion D under which there is no first purifier A. However, the second purifier B may consists only of the superposed portion C. In this case, for example, the first purifier A may extend the entire length of the downstream exhaust purifying unit 11, and the superposed portion C, i.e., the entire second purifier B, may extend the entire length of the downstream exhaust purifying unit 11.

If the first purifier A of the downstream exhaust purifying unit 11 has a predetermined treatment capacity, the upstream exhaust purifying unit 10 having its own first purifier A may be omitted.

While the embodiment has been described with reference to purifying exhaust gases from a gasoline engine, the present invention is applicable to any engines other than gasoline engines that need reduction of nitrogen oxides in the exhaust gases, and detoxification of ammonia produced from the nitrogen oxides.

DESCRIPTION OF THE REFERENCE NUMERALS AND SYMBOLS

1. Combustion chamber
2. Fuel injector
3. Intake passage
4. Exhaust passage
5. Throttle valve
6. Air flow sensor
7. Supercharger (turbine)
8. Engine
10. Upstream exhaust purifying unit (exhaust purifying unit/proximity catalyst)
11. Downstream exhaust purifying unit (exhaust purifying unit/underfloor catalyst)
12. Upstream catalyst case
13. Downstream catalyst case
20. Carrier
21. Nitrogen oxide reduction element
22. Upstream high temperature purifying part
23. Downstream high temperature purifying part
24. Downstream low temperature purifying part
30. Electronic control unit
31. Engine control subunit
A. First purifier (three-way catalyst layer)
B. Second purifier (selective catalytic reduction catalyst layer)
C. Superposed portion
D. Unsuperposed portion
a. Exhaust gas temperature detector
b. Ammonia detector
c. Nitrogen oxide detector
d. $O_2$ sensor

What is claimed is:

1. An exhaust gas purification system for an engine having a combustion chamber, the exhaust gas purification system comprising:
    an exhaust passage extending from the combustion chamber of the engine; and
    upstream and downstream exhaust purifying units disposed in the exhaust passage and configured to purify exhaust gas in the exhaust passage, the upstream exhaust purifying unit being disposed upstream of, and in juxtaposition with, the downstream exhaust purifying unit along the exhaust gas flow direction in the exhaust passage,
    the downstream exhaust purifying unit including:
        a carrier disposed in the exhaust passage;
        a first purifier having a three-way catalytic function and having at least a function of oxidizing components in the exhaust gas, the first purifier covering, as an underlayer, an outer surface of the carrier; and
        a second purifier having a function of purifying the exhaust gas by reducing, using occluded ammonia, the components in the exhaust gas that have been oxidized in the first purifier, the second purifier including a superposed portion covering, as an upper layer, an outer surface of the first purifier, the second purifier further including an unsuperposed portion located downstream of the first purifier and covering the outer surface of the carrier,
    wherein the superposed portion of the second purifier extends to an upstream end of the first purifier with respect to an exhaust gas flow direction, and
    wherein the upstream exhaust purifying unit also includes a first purifier having a three-way catalytic function.

2. The exhaust gas purification system of claim 1, wherein the first purifier of each of the upstream and downstream exhaust purifying units comprises a three-way catalyst layer, and the second purifier comprises a selective catalytic reduction catalyst layer.

3. The exhaust gas purification system of claim 1, wherein the upstream exhaust purifying unit is free of the second purifier.

4. The exhaust gas purification system of claim 2, further comprising:
    an ammonia detector disposed upstream of the second purifier, the ammonia detector being configured to obtain first information regarding an amount of ammonia flowing into the second purifier;
    a nitrogen oxide detector disposed downstream of the second purifier, the nitrogen oxide detector being configured to obtain second information regarding the amount of emissions of nitrogen oxides; and
    an engine control unit configured to control an amount of fuel injected into the combustion chamber and an amount of intake air supplied into the combustion chamber, based on the first information and the second information.

5. The exhaust gas purification system of claim 3, further comprising:
    an ammonia detector disposed upstream of the second purifier, the ammonia detector being configured to obtain first information regarding an amount of ammonia flowing into the second purifier;
    a nitrogen oxide detector disposed downstream of the second purifier, the nitrogen oxide detector being configured to obtain second information regarding the amount of emissions of nitrogen oxides; and
    an engine control unit configured to control an amount of fuel injected into the combustion chamber and an amount of intake air supplied into the combustion chamber, based on the first information and the second information.

6. An exhaust gas purification system for an engine having a combustion chamber, the exhaust gas purification system comprising:
    an exhaust passage extending from the combustion chamber of the engine; and
    an exhaust purifying unit disposed in the exhaust passage and configured to purify exhaust gas in the exhaust passage,
    the exhaust purifying unit including:
        a carrier disposed in the exhaust passage;
        a first purifier having at least a function of oxidizing components in the exhaust gas, the first purifier covering, as an underlayer, an outer surface of the carrier; and
        a second purifier having a function of purifying the exhaust gas by reducing, using occluded ammonia, the components in the exhaust gas that have been oxidized in the first purifier, the second purifier including a superposed portion covering, as an upper layer, an outer surface of the first purifier, the second purifier further including an unsuperposed portion located downstream of the first purifier and covering the outer surface of the carrier, wherein the superposed portion includes an upstream high temperature purifying part having a first activation temperature at which the upstream high-temperature purifying part is activated, and wherein the unsuperposed portion includes a downstream low temperature purifying part having a second activation temperature at which the downstream low temperature purifying part is activated, the second activation temperature being lower than the first activation temperature.

7. The exhaust gas purification system of claim 6, wherein the unsuperposed portion further includes a downstream high temperature purifying part disposed under the downstream low temperature purifying part, the downstream high temperature purifying part having a third activation temperature at which the downstream high temperature purifying part is activated, the third activation temperature being higher than the second activation temperature.

8. The exhaust gas purification system of claim 7, wherein the first activation temperature is equal to the third activation temperature.

9. The exhaust gas purification system of claim 6, wherein the exhaust purifying unit comprises a downstream exhaust purifying unit, and the exhaust gas purification system further comprises an upstream exhaust purifying unit disposed upstream of, and in juxtaposition with, the downstream exhaust purifying unit along an exhaust gas flow direction in the exhaust passage, and
wherein the upstream exhaust purifying unit includes the first purifier, and is free of the second purifier.

10. The exhaust gas purification system of claim 7, wherein the exhaust purifying unit comprises a downstream exhaust purifying unit, and the exhaust gas purification system further comprises an upstream exhaust purifying unit disposed upstream of, and in juxtaposition with, the downstream exhaust purifying unit along an exhaust gas flow direction in the exhaust passage, and
wherein the upstream exhaust purifying unit includes the first purifier, and is free of the second purifier.

11. The exhaust gas purification system of claim 8, wherein the exhaust purifying unit comprises a downstream exhaust purifying unit, and the exhaust gas purification system further comprises an upstream exhaust purifying unit disposed upstream of, and in juxtaposition with, the downstream exhaust purifying unit along an exhaust gas flow direction in the exhaust passage, and
wherein the upstream exhaust purifying unit includes the first purifier, and is free of the second purifier.

12. The exhaust gas purification system of claim 6, further comprising:
an ammonia detector disposed upstream of the second purifier, the ammonia detector being configured to obtain first information regarding an amount of ammonia flowing into the second purifier;
a nitrogen oxide detector disposed downstream of the second purifier, the nitrogen oxide detector being configured to obtain second information regarding the amount of emissions of nitrogen oxides; and
an engine control unit configured to control an amount of fuel injected into the combustion chamber and an amount of intake air supplied into the combustion chamber, based on the first information and the second information.

13. The exhaust gas purification system of claim 7, further comprising:
an ammonia detector disposed upstream of the second purifier, the ammonia detector being configured to obtain first information regarding an amount of ammonia flowing into the second purifier;
a nitrogen oxide detector disposed downstream of the second purifier, the nitrogen oxide detector being configured to obtain second information regarding the amount of emissions of nitrogen oxides; and
an engine control unit configured to control an amount of fuel injected into the combustion chamber and an amount of intake air supplied into the combustion chamber, based on the first information and the second information.

14. The exhaust gas purification system of claim 8, further comprising:
an ammonia detector disposed upstream of the second purifier, the ammonia detector being configured to obtain first information regarding an amount of ammonia flowing into the second purifier;
a nitrogen oxide detector disposed downstream of the second purifier, the nitrogen oxide detector being configured to obtain second information regarding the amount of emissions of nitrogen oxides; and
an engine control unit configured to control an amount of fuel injected into the combustion chamber and an amount of intake air supplied into the combustion chamber, based on the first information and the second information.

15. An exhaust gas purification system for an engine having a combustion chamber, the exhaust gas purification system comprising:
an exhaust passage extending from the combustion chamber of the engine; and
an exhaust purifying unit disposed in the exhaust passage and configured to purify exhaust gas in the exhaust passage,
the exhaust purifying unit including:
a carrier disposed in the exhaust passage;
a first purifier having at least a function of oxidizing components in the exhaust gas, the first purifier covering, as an underlayer, an outer surface of the carrier;
a second purifier having a function of purifying the exhaust gas by reducing, using occluded ammonia, the components in the exhaust gas that have been oxidized in the first purifier, the second purifier including a superposed portion covering, as an upper layer, an outer surface of the first purifier, the second purifier further including an unsuperposed portion located downstream of the first purifier and covering the outer surface of the carrier;
an ammonia detector disposed upstream of the second purifier, the ammonia detector being configured to obtain first information regarding an amount of ammonia flowing into the second purifier;
a nitrogen oxide detector disposed downstream of the second purifier, the nitrogen oxide detector being configured to obtain second information regarding the amount of emissions of nitrogen oxides; and
an engine control unit configured to control an amount of fuel injected into the combustion chamber and an amount of intake air supplied into the combustion chamber, based on the first information and the second information.

* * * * *